Patented Feb. 2, 1954

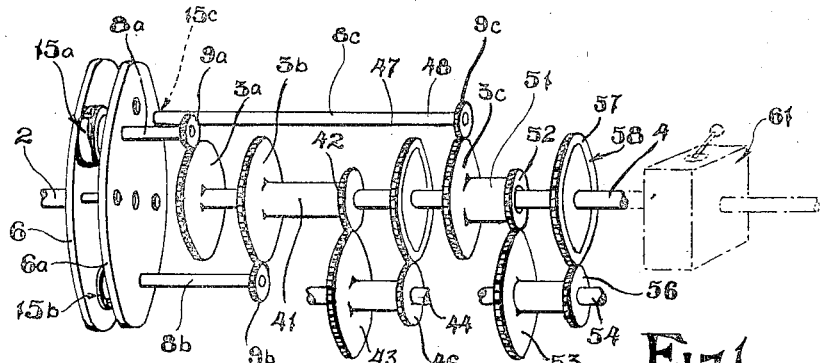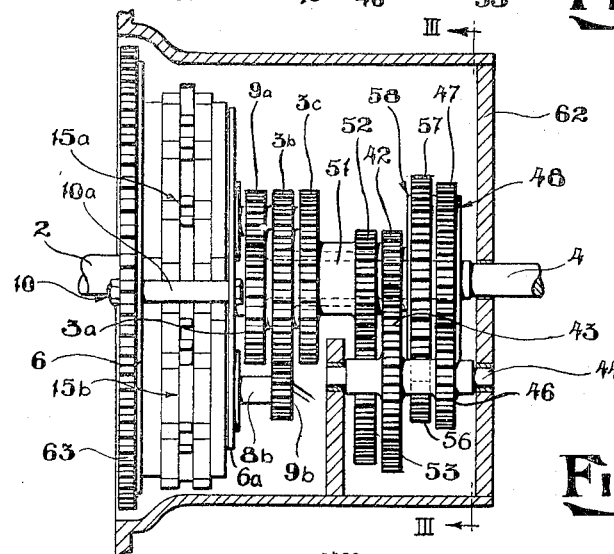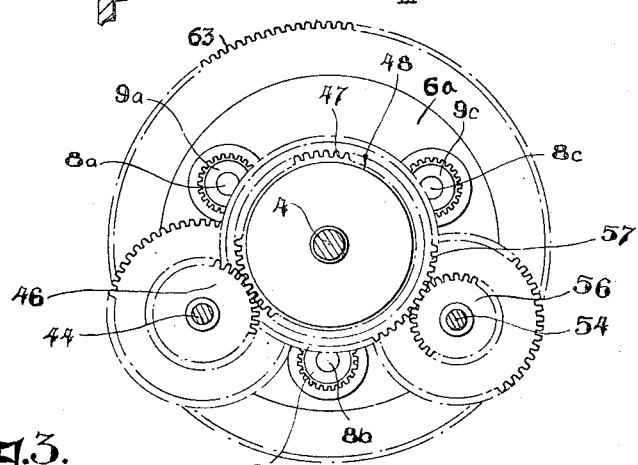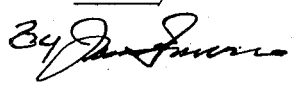

2,667,794

UNITED STATES PATENT OFFICE 2,667,794

VARIABLE SPEED POWER TRANSMISSION MECHANISM

Henry McGill, Pearcedale, Victoria, Australia, assignor to James Albert Cavanagh, East Praham, Victoria, and Henry William Thomas Ireland, St. Kilda, Victoria, Australia Application April 25, 1950, Serial No. 157,914

Claims priority, application Australia May 2, 1949

1 Claim. (Cl. 74—752)

This invention relates to variable speed power transmission mechanism wherein centrifugal force arising from weights or weighted members revolving with a driving member is utilized to govern the speed ratio and torque conversion between driving and driven members.

The primary object of the invention is to provide a simple and efficient mechanism of the kind indicated in which suitable ratios will be automatically adjusted by the mechanism in accordance with variations in the speed or power of the driving member or in the load or torque resistance of the driven member.

The improved mechanism is particularly suitable for power transmission purposes in internal combustion engined vehicles and, in such instances, eliminates the usual flywheel, clutch and change speed mechanism, and thus makes for extreme simplicity in construction and in control.

A mechanism of this type is disclosed by prior United States Patent No. 1,983,916, in the name of Henry McGill. According to that patent the mechanism includes a rotary driving member carrying one or more planet pinions which mesh with a sun pinion constituting the driven member, the load or torque resistance of which tends to rotate each planet pinion in what may be termed a forward direction such as would cause it to roll idly around the sun pinion. Such rotation of each planet pinion is resisted and partially or wholly overcome by the force exerted by a number of weights or weighted members having a driving connection with the planet pinion and constrained to move, due to centrifugal force arising from the rotation of the driving member, along a path which is eccentric to the planet pinion. The speed ratio between the driving and driven members is thus determined by the extent to which the force of the centrifugally influenced weights or weighted members overcomes rotation of the planet pinion in a forward direction, the speed ratio becoming 1:1 in the event of rotation of the planet pinion being prevented.

The embodiment described and illustrated in that patent comprises three sets of weighted elements (hereinafter referred to as the centrifugal elements), each set of elements having a planet pinion which enmeshes a single sun pinion at different points of its periphery, the sun pinion being connected to a shaft or the like to be driven either directly for forward rotation or through reverse gearing for rotation in the other direction. That previous mechanism was more particularly beneficial for torque transmission and variations of speed in a driven member, rather than for torque conversion. The present invention aims to improve the operational efficiency of mechanism of the kind indicated, and particularly to provide for automatic torque conversion as well as variable speed transmitted to a driven member.

According to the major feature of the present invention, the planet pinions of the respective centrifugal elements have separate and independent driving connection with separate sun pinions. Usually three centrifugal elements will be provided and, consequently, three planet pinions and three sun pinions. Of the latter, two may be connected by toothed reduction gearing at ratios of, say, 4 to 1 and 2 to 1 to a driven shaft while the third may have a direct or 1 to 1 connection. Provision for reverse drive may, of course, be made.

The invention will be more readily understood by reference to the accompanying sheet of drawings, showing a preferred and practicable embodiment, in which:

Figure 1 is a diagrammatic perspective representation of the embodiment.

Figure 2 is a side view of the typical and practical embodiment in an assembled condition.

Figure 3 is an end view taken on the line III—III of Figure 2.

Where applicable, like references to those in Patent No. 1,983,916 are used in this description.

In the drawings, 2 indicates a driving shaft which may be connected to the crankshaft of an internal combustion engine.

The numerals 3a, 3b and 3c respectively indicate driven members in the form of sun pinions, co-axial with the driving shaft, adapted to be coupled to a driven shaft 4.

The driving shaft 2 has secured thereto two longitudinally spaced discs 6 and 6a, constituting a carrier for three planet pinions, between which discs three centrifugal elements 15a, 15b and 15c (each comprising a weight carrier or spider and eccentrically movable weights as described in Patent No. 1,983,916) are mounted on spindles 8a, 8b and 8c respectively.

The discs are held in spaced relationship by bolts 10 and distance pieces 10a.

The spindles 8a, 8b and 8c are respectively provided with planet pinions 9a, 9b and 9c, which respectively mesh with the sun pinions 3a, 3b and 3c.

The sun pinion 3a is directly coupled to the driven shaft 4; thus, as relative movement between the planet pinion 9a and sun pinion 3a is diminished or prevented by effective operation of the centrifugal element 15a, direct drive, or a speed ratio of 1 to 1, from the driving shaft 2 to the driven shaft 4 will result. Element 15a and associated pinion 9a will be later referred to as No. 3 gear train.

The sun pinion 3b is mounted on a bearing boss 41, rotatably mounted on shaft 4, and provided with a pinion 42 which is in mesh with a gear wheel 43 carried on a lay shaft 44. The gear wheel 43 is directly connected to a pinion 46 which meshes with a gear wheel 47, which incorporates an overrunning clutch 48 of any suitable form.

The gear wheel 47 is directly coupled through the overrunning clutch 48 to the driven shaft 4; thus as relative movement between the planet pinion 9b and sun pinion 3b is diminished or prevented by effective operation of the centrifugal element 15b, and the over-running clutch 48 engages, a speed reduction of, for example 2 to 1, depending on a predetermined ratio of the gears and pinions—and corresponding increase in transmitted torque—from the driving shaft 2 to the driven shaft 4 will result. Element 15b and associated gear train will be later referred to as No. 2 gear train.

The sun pinion 3c is mounted on a bearing boss 51, which is rotatably mounted with respect to shaft 4 (and, in practice, may be rotatably mounted or journalled on the bearing boss 41). A pinion 52 is connected to the boss 51 and is in mesh with a gear wheel 53 carried on a lay shaft 56.

The gear wheel 53 is directly connected to a pinion 54 which meshes with a gear wheel 57, which also incorporates an over-running clutch 58.

The gear wheel 57 is directly coupled through the overrunning clutch 58 to the driven shaft 4; thus as relative movement between the planet pinion 9c and sun pinion 3c is diminished or precented by effective operation of the centrifugal element 15c, the clutch 58 engages and a speed reduction, dependent on the ratio of the gears and pinions selected, for example, 4 to 1—and corresponding increase in transmitted torque—from the driving shaft 2 to the driven shaft 4 will result. Element 15c and associated gear train will be later referred to as No. 1 gear train.

The over-running clutches 48 and 58 may be of any well known or suitable form, such that the peripheries of either of the gears 57 or 58 may freely rotate in one direction without turning the hub of the gear, whereas the hub of the gear will be correspondingly driven when the periphery is caused to be rotated in the other, or driving, direction.

It will be apparent that, with clutches of the kind indicated, it is possible for the hub of the gears 57 and 58 to "overrun" their respective peripheries, and such characteristic is availed of when the invention is in use.

Provision for reverse drive may comprise a gear train, manually manipulable and of conventional style, mounted between the driven shaft 4 and the transmission mechanism of a vehicle, as indicated at 61.

The mechanism according to the invention may be mounted in a casing 62, within which are mounted bearings for the lay shafts 44 and 54.

A ring gear 63, for engagement by the pinion of a conventional starter-motor, may be attached to the forward disc 6.

In operation:

When the prime mover, or the engine, is put into action driving the shaft 2, the three centrifugal elements with their attendant planet and sun pinions are constrained to exert turning movement, or pressure, upon the driven member through their respective trains of gears, and will be revolving at different speeds. Although the ratio through one train of gears may be designated as 4 to 1, the actual speed reduction may be considerably less owing to the three elements exerting pressure at different values upon the driven shaft.

When the load is moved from standstill, the three centrifugal elements and associated gear trains will be transmitting the engine speed and power upon the said load and, as the load tends to decrease No. 1 gear train will slow down with respect to the driving shaft and carrier 6—6a and become stationary relatively thereto, whereupon it may be said the 4 to 1 gear is operating. As the load further decreases No. 2 gear train will become similarly relatively stationary and operative and the drive from No. 1 gear train will be "overrun" through the over-running clutch 58; the same will occur when No. 3 gear train becomes relatively stationary and operative, whereupon No. 2 gear train will be "overrun" through over-running clutch 48, and direct drive will then be taking place.

Conversely, if the load should increase, the respective gear trains will again take up their drive in turn as the driven shaft slows down and the clutches engage.

It will thus be seen that, when the load is greatest, the torque of the prime mover will be transmitted through a series of reduction gearings and, as the load tends to decrease, so the optimum torque is progressively delivered culminating in a 1 to 1 or direct drive.

It will be understood that more or less than three elements may be employed and that the ratios of their respective reduction gears may be determined by test and selected or varied according to requirements.

Other alterations, modifications and/or additions may be incorporated in the foregoing without departing from the spirit and scope of the invention.

Having now described my invention, what I claim as new and desire to secure by Letters Patent is:

In a variable speed power transmission mechanism of the type wherein a rotary driving member carries a plurality of centrifugal elements, each of which includes a series of masses movable in an eccentric path around the axis of a planet pinion to which each element is directly connected to retard rotation of that planet pinion as it travels around sun pinion means on a driven shaft, the improvement comprising separate sun pinions for each planet pinion, one sun pinion being directly connected to said shaft, trains of reduction gears having low and high speed characteristics respectively connecting the other sun pinions to the shaft, and overrunning clutches in each of said trains of reduction gears whereby relative movement between a planet pinion and its sun pinion is diminished or prevented by effective operation of its centrifugal element, the drive from the driving member to the driven shaft will be imparted through the related gearing arrangement at variable speed ratio or torque conversion automatically and commensurate with varying loads on the driven shaft and the common driven shaft may overrun the gear trains of the lower-speed characteristic when being effectively driven by a gear train of the higher speed characteristic.

HENRY McGILL.

References Cited in the file of this patent

UNITED STATES PATENTS

| Number | Name | Date |
|---|---|---|
| 1,983,916 | McGill | Dec. 11, 1934 |
| 2,034,988 | Wilsson et al. | Mar. 24, 1936 |
| 2,112,487 | Freehorn | Mar. 29, 1938 |
| 2,155,132 | Henriod | Apr. 18, 1939 |
| 2,201,847 | Cheng | May 21, 1940 |

FOREIGN PATENTS

| Number | Country | Date |
|---|---|---|
| 474,286 | Great Britain | Oct. 25, 1937 |
| 502,399 | Great Britain | Mar. 10, 1939 |